Feb. 23, 1960

H. G. WIMBERLEY 2,926,036

FISHERMAN'S KNOT TYING TOOL

Filed March 27, 1958

Herbert G. Wimberley
INVENTOR.

BY *Clarence A. O'Brien
and Harvey B. Jacobson*
Attorneys 2,926,036

FISHERMAN'S KNOT TYING TOOL

Herbert G. Wimberley, Willcox, Ariz.

Application March 27, 1958, Serial No. 724,310

4 Claims. (Cl. 289—17)

The present invention relates to new and useful improvements in fisherman's tools and has for its primary object to provide, in a manner as hereinafter set forth, a device of this character comprising novel means for expeditiously and firmly tying leaders or lines to fishing hooks or flies.

Another very important object of the invention is to provide a fisherman's tool of the character described which comprises, in a single device, a fish scaler, a hook disgorger, a knot tier and a screwdriver.

Other objects of the invention are to provide a combination fisherman's tool of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
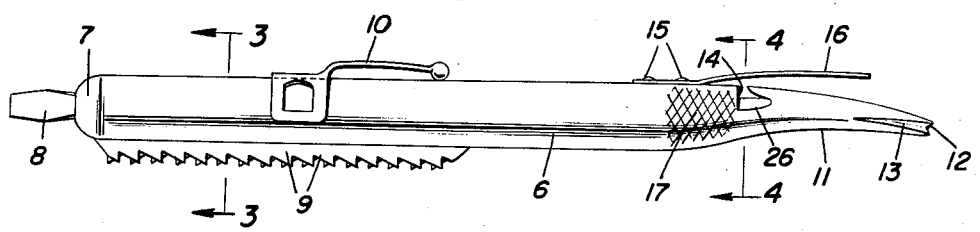
Figure 1 is a view in side elevation of a fisherman's tool constructed in accordance with the present invention.
Figure 2:
Figure 2 is a view in top plan of the device.
Figure 3:
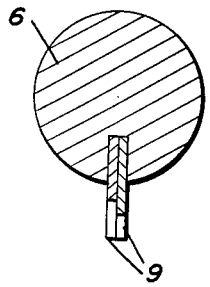
Figure 3 is an enlarged view in transverse section, taken substantially on the line 3—3 of Figure 1.
Figure 4:
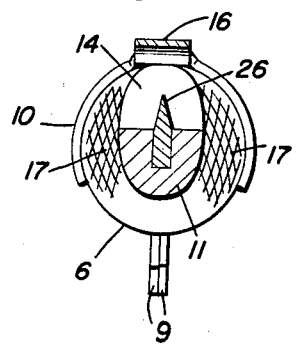
Figure 4 is an enlarged view in transverse section, taken substantially on the line 4—4 of Figure 1.

Referring now to the drawing in detail, it will be seen that the embodiment of the invention which has been illustrated comprises an elongated handle 6 of circular cross-section, which handle may be of wood, plastic or other suitable material. The handle 6 includes a rounded rear end portion 7 having anchored therein and projecting longitudinally therefrom a screwdriver 8. Embedded longitudinally in the lower, rear portion of the handle 6 is a pair of toothed fish scaling blades 9. Reference character 10 designates a pocket clip on the handle 6.

Formed integrally with the forward end of the handle 6 is a tapered, slightly downwardly curved mandrel 11 having a notch 12 in its forward or free end. Formed longitudinally in the sides of the mandrel 11 are tapered grooves or channels 13 which communicate with the notch 12. Formed transversely in the inner or rear portion of the mandrel 11 is a slot or kerf 14. Secured as at 15 on the upper, forward portion of the handle 6 and projecting forwardly over the kerf 14 is a resilient metallic finger 16 which conforms substantially to the curvature of the mandrel 11 but which is spaced therefrom. Adjacent the kerf 14 the sides of the handle 6 comprise checkered areas or portions 17.

Figure 5:
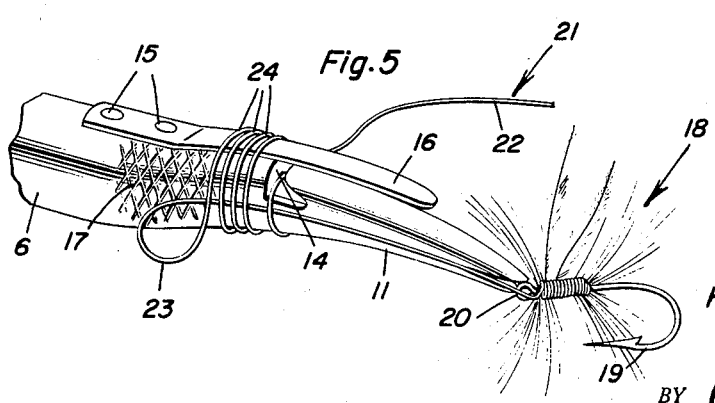
Figure 5 is a perspective view of the forward end portion of the device, showing a knot being tied.

In Figure 5 of the drawing, reference character 18 designates generally a conventional fly comprising the usual hook 19 having an eye 20 on one end. Reference character 21 designates a leader to be tied to the fly 18. To accomplish this, the leader 21 is threaded a sufficient distance through the eye 20 of the hook 19. The handle 6 is gripped in the left hand with the finger 16 uppermost. With the forefinger of the left hand, the leader is held against the checkered area 17 on the remote side of the handle 6 and the loose end portion 22 of said leader, with the fly 18 thereon, is looped longitudinally around the mandrel 11, being engaged in the notch 12 and the grooves or channels 13 and secured at 23 with the thumb of the left hand on the checkered area 17 of the handle 6 which faces the operator. The free end portion 22 of the leader 21 is then wound or looped several times around the rear portion of the tapered mandrel 11 and the resilient finger 16, as at 24, and engaged in the kerf 14. The free or loose end portion of the leader is then secured with the forefinger of the left hand on the checkered area 17 on the remote side of the handle 6. With the right hand, the fly 18 is then pulled forwardly and the leader is gradually released at the areas 17. As the loose end portion of the leader is thus released the loops 24 are slid forwardly thereover, riding on the resilient finger 16 for forming a slip knot. With the leader removed from the tool the knot is slipped to the eye 20 of the hook 19 and the excess material of said leader is cut off. To facilitate this last step a cutting blade 26 is mounted in the kerf 14. The resilient finger 16 also functions as a guide to facilitate engaging the leader or line in the kerf 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tying device for knotting a flexible strand in the eye of a fish hook, said device comprising: an elongated handle, a mandrel on one end of said handle for winding and slidably removably receiving an end portion of the strand thereon, said mandrel including a free end having a notch therein receiving and retaining the strand before it is wound, means for anchoring said one end portion of the strand to the mandrel after said strand is wound thereon, means for conveying the windings over the anchored end portion of the strand when said windings are slipped off the mandrel, said anchoring means including a transverse kerf in the mandrel for the reception of the strand, and a knife in the kerf for severing the strand.

2. A tying device for knotting a flexible strand in the eye of a fish hook, said device comprising: an elongated handle, a mandrel on one end of said handle for winding and slidably removably receiving an end portion of the strand thereon, said mandrel including a free end having a notch therein receiving and retaining the strand before it is wound, means for anchoring said one end portion of the strand to the mandrel after said strand is wound thereon, and means for conveying the windings over the anchored end portion of the strand when said windings are slipped off the mandrel, the last named means including a finger substantially paralleling the mandrel in spaced relation thereto and adapted to slidably receive the windings thereon.

3. A tying device for knotting a flexible strand in the eye of a fish hook, said device comprising: an elongated handle, a mandrel on one end of said handle for winding and slidably removably receiving an end portion of the strand thereon, said mandrel including a free end having a notch therein receiving and retaining the strand before it is wound, means for anchoring said one end portion of the strand to the mandrel after said strand is wound thereon, and means for conveying the windings over the anchored end portion of the strand when said windings are slipped off the mandrel, said anchoring means including a transverse kerf in the mandrel for the reception of the strand, the last named means comprising a resilient, tapered finger mounted longitudinally on the handle and extending forwardly therefrom in spaced, substantially parallelism with the mandrel and adapted to slidably receive the windings thereon, said finger traversing the kerf.

4. A tying device for knotting a flexible strand in the eye of a fish hook, said device including: an elongated handle, a tapered, arcuate mandrel on one end of said handle for windingly receiving the strand thereon and having a notch in its free end for receiving the strand before it is wound thereon, said mandrel further having a transverse kerf therein forwardly of the windings for receiving and retaining an end portion of the strand after said strand is wound, and a resilient, tapered, longitudinally curved finger traversing the kerf and extending in spaced, substantially parallel relation to the mandrel and adapted to slidably receive the windings thereon for passing same over said end portion of the strand when said windings are slipped off the mandrel.

References Cited in the file of this patent
UNITED STATES PATENTS

| | | |
|---|---|---|
| 1,322,826 | Ryerson | Nov. 25, 1919 |
| 2,459,530 | Johnston | Jan. 18, 1949 |
| 2,622,729 | Uttz | Dec. 23, 1952 |
| 2,697,624 | Thomas et al. | Dec. 21, 1954 |
| 2,758,858 | Smith | Aug. 14, 1956 |